United States Patent Office 3,567,784
Patented Mar. 2, 1971

---

3,567,784
ALCOHOL ALKOXYLATES
William T. Tsatsos, San Mateo, Calif., Richard F. Schimbor, New Brunswick, N.J., and Rupert C. Morris, Berkeley, Calif., assignors to Shell Oil Company, New York, N.Y.
No Drawing. Continuation-in-part of application Ser. No. 661,546, Aug. 18, 1967. This application June 13, 1969, Ser. No. 833,160
Int. Cl. C07c 43/00
U.S. Cl. 260—615    7 Claims

ABSTRACT OF THE DISCLOSURE

Certain ethylene oxide-propylene oxide-ethylene oxide derivatives of mixtures of $C_{10}$–$C_{15}$ detergent range alcohols of critical ethylene oxide-propylene oxide ratios and critical ratios of ethylene oxide to carbon atoms in the alcohol moiety, useful as surfactants, exhibit superior physical properties such as high cloud points and low gel temperatures.

---

This application is a continuation-in-part of copending application, U.S. Ser. No. 661,546, filed Aug. 18, 1967, and now abandoned.

BACKGROUND OF THE INVENTION

Field of the invention

Synthetic surfactants, e.g., detergents, can be characterized as compounds which incorporate within the molecular structure thereof a hydrophobic moiety, typically a long-chain alkyl moiety, and also a hydrophilic moiety which because of being polar in character or having ionic charge is capable of interaction with water molecules. When the hydrophilic moiety is characterized by a formal ionic charge, the surfactant is classified as anionic or cationic, depending upon the nature of the ionic charge. Alternatively, if the hydrophilic moiety does not possess a formal ionic charge, the surfactant is termed a non-ionic surfactant. One frequently encountered class of non-ionic surfactants comprises alkylene oxide derivatives of active hydrogen compounds, particularly the alkylene oxide derivatives of fatty acids or long-chain alcohols.

Description of the prior art

Simple condensation products of a single alkylene oxide, particularly ethylene oxide, and a higher alcohol are well known in the art. Of more recent importance are alkylene oxide derivatives of higher alcohols wherein the polyoxyalkylene portion incorporates more than one type of alkylene oxide, e.g., incorporates moieties of ethylene oxide and also moieties of propylene oxide. The presence of the propylene oxide or a higher alkylene oxide serves to modify and in general reduce the hydrophilic character of the alkylene oxide portion of the surfactant. By way of illustration, U.S. 3,036,130 issued May 22, 1962, to Jackson et al. discloses alkoxylates derivatives of monohydric alcohols wherein a first alkylene oxide block is ethylene oxide and a second alkylene oxide block is propylene oxide. A similar disclosure is found in U.S. 2,677,700, issued May 4, 1954, also to Jackson et al., except that in this earlier patent the first alkylene oxide block is propylene oxide and the second block is ethylene oxide. A somewhat different type of derivative is disclosed in U.S. 3,101,374 issued Aug. 20, 1963, to Patton. There, lower alcohols were alkoxylated initially with ethylene oxide and propylene oxide and then with a mixture of ethylene oxide and propylene oxide to introduce a second block which was heteric, that is, consisted of a random mixture of ethylene oxide and propylene oxide.

Although these types of alkylene oxide derivatives are broadly useful as surfactants, they customarily suffer from certain disadvantages such as relatively high melting point, a relatively low cloud point and a tendency to form a gel when added to water. In addition, alkylene oxide derivatives unduly high in the proportion of propylene oxide do not meet the contemporary requirements for facile biodegradation.

SUMMARY OF THE INVENTION

It has now been found that certain ethylene oxide-propylene oxide-ethylene oxide derivatives of mixtures of alcohols of 10 to 15 carbon atoms wherein the relative proportion of each of the three homoblocks is within certain critical limitations, exhibit the expected surfactant properties but also exhibit superior physical properties which are not present in closely related alkylene oxide derivatives.

DESCRIPTION OF PREFERRED EMBODIMENTS

The alkoxylated higher alcohols of the invention comprise a mixture of at least two alkanols of differing carbon number in the $C_{10}$–$C_{15}$ range, each of which is derivatized with three homo-blocks of alkylene oxide, the first and third of which are ethylene oxide with the second or center block being propylene oxide. More particularly, the alkoxylated alcohol derivatives are represented as a mixture of compound compounds of the average formula $$RO\text{—}(C_2H_4O)_x\text{—}(C_3H_6O)_y\text{—}(C_2H_4O)_z\text{—}H \qquad (I)$$ 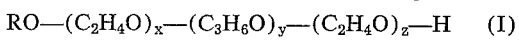

wherein R is alkyl of 10.5 to 14.5 carbon atoms, the ratio of carbon atoms in R to the total carbon atoms in ethoxy moieties, i.e., to the term $2(x+z)$, is from 0.52 to 0.65, the ratio of total ethoxy moieties to propoxy moieties, i.e., the term $(x+z)/y$, is from 2.9 to 3.1 and $x$ is from $z$ to $1.2z$. From the above relationships between R, $x$, $y$ and $z$, and the value of R, i.e., from 10.5 to 14.5, it is inherent that $x$ varies from 3.7 to 8.4 inclusive, $y$ varies from 2.4 to 5.3 inclusive, and $z$ varies from 3.7 to 7.0 inclusive.

The term R, representing an average number of carbon atoms in the alcohol moiety of an alkoxylated mixture of alcohols, and the terms $x$, $y$ and $z$, representing an average number of alkoxy moieties, are other than a whole number in many instances.

The alcohol precursor,—Broadly speaking, the alkoxylated derivatives are derivatives of mixed $C_{10}$–$C_{15}$ primary alcohols with at least a portion of the total alkylene oxide derivative being a derivative of primary alcohols of at least two carbon numbers within the $C_{10}$ to $C_{15}$ range. The alcohol precursors of the alkylene oxide derivatives are straight-chain alcohols or are of a branched-chain structure, but when branched, it is preferred that the sole side-chain branching be that of a single straight-chain alkyl substituent in the beta or 2 position. The class of alcohols of the formula ROH wherein R has the previously stated significance is represented by the formula

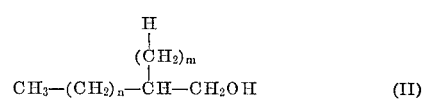

$$CH_3\text{—}(CH_2)_n\text{—}CH\text{—}CH_2OH \qquad (II)$$

wherein $m$ is a whole number from 0 to 5 inclusive and $n$ is a whole number from 2 to 12 inclusive selected so that the sum of $m$ and $n$, i.e., the term $(m+n)$, is a whole number from 7 to 12 inclusive.

The above Formula II provides for alcohols which are straight-chain or which have a beta alkyl substituent which is methyl, ethyl, propyl, butyl or amyl and in many instances at least a minor proportion of alcohol of each type is present. At least a substantial portion of the alcohol of each carbon number is of the straight-chain structure, i.e., the compound of the above Formula II wherein $m$ is 0, and in preferred modifications at least about 60%, more preferably at least about 80%, of the alcohols of each carbon number are straight-chain in structure. Of any alcohols that are branched, the predominant type is that having a beta-methyl branch and typically about 50% of the branched alcohols are beta-methyl alcohols with lesser amounts of the other branched-chain isomers.

The alcohols, or the aldehydes corresponding thereto, are conveniently produced by reaction of straight-chain olefins of from 9 to 14 carbon atoms with carbon monoxide and hydrogen. The reaction can be carried out to produce aldehydes in accordance with the well known oxo process, which aldehydes are subsequently hydrogenated to alcohols, or can be conducted as a hydroformylation reaction in which the aldehydes initially formed are simultaneously hydrogenated and converted to saturated primary alcohols of 10 to 15 carbon atoms. In these procedures both straight-chain and branched products are formed. The product mixtures within the desired range of proportions are useful as such or alternatively the individual components are separated by conventional procedures and recombined to provide a mixture having any desired proportion of alcohol types.

Suitable methods of producing oxo aldehydes which are hydrogenated to the desired alcohols are described in U.S. Pats. 2,564,456 and 2,587,858, for example. As a general rule it is more advantageous to use a hydroformylation method to make an alcohol mixture directly. U.S. Pats. 2,504,682 and 2,581,988 describe processes of this type. The hydroformylation is suitably carried out in the presence of a hydrogenation catalyst, advantageously using a temperature of about 200° C. to 400° C. under superatmospheric pressure, preferably at least 200 atmospheres, with a molar ratio of olefin to carbon monoxide to hydrogen in the range of from about 1:2:2 to about 1:5:20. British Pat. 638,574 describes suitable methods of operation using cobalt, copper, nickel or ruthenium and their carbonyls as catalyst. Better results are obtained by use of the complex metal carbonyltertiaryorgano catalysts containing phosphorus, arsenic or antimony, whose use in hydroformylation is described in Belgian Pat. 606,408, because of the reduced pressure requirement thereby made available.

It is evident that by starting with an olefin of a single carbon number, an alcohol of a single carbon number will result. However, it is also useful to employ a mixture of olefins of differing carbon number within the $C_9$ to $C_{14}$ range and thereby obtain a corresponding mixture of alcohols of differing carbon number within the $C_{10}$ to $C_{15}$ range.

The alkoxylated alcohol derivative.—The alkoxylated alcohol derivatives, as previously stated, are ethylene oxide-propylene oxide-ethylene oxide derivatives of a mixture of at least two primary alcohols of the $C_{10}$ to $C_{15}$ range as defined above. In terms of the above Formulas I and II, the preferred derivatives are represented by the formula

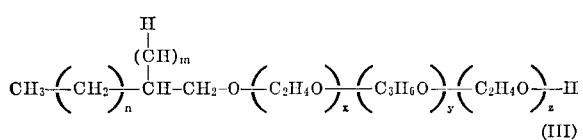

(III)

wherein $m$, $n$, $x$, $y$ and $z$ have the previously stated significance. It should be appreciated that there will be present alkoxylated derivatives of alcohols of at least two of the carbon numbers within the $C_{10}$ to $C_{15}$ range. Although the exact proportion of derivative of alcohol of each carbon number is not critical, preferred modifications comprise up to about 50% mole based on total mixture of alkoxylated derivatives of at least two of the $C_{10}$, $C_{11}$, $C_{12}$, $C_{13}$, $C_{14}$ and $C_{15}$ alcohols, and more preferably from about 15% to about 30% by weight on the same basis of derivatives of alcohols of at least four of the 10, 11, 12, 13, 14 and/or 15 carbon numbers. Especially preferred is an alkoxylated approximately equimolar mixture of $C_{12}$, $C_{13}$, $C_{14}$ and $C_{15}$ alcohols.

The alkoxylated alcohol derivatives are produced by more or less conventional methods. Suitable results are obtained by adding to the alcohol to be alkoxylated a catalytic amount, e.g., from about 0.1% by weight to about 0.4% by weight based on total alcohol of a strong base, typically sodium hydroxide or potassium hydroxide, which serves as catalyst for the alkoxylation. An amount of ethylene oxide calculated to provide the desired degree of ethoxylation is then introduced and the resulting mixture is allowed to react until the ethylene oxide is consumed, as indicated by a drop in reaction pressure. A similar introduction and reaction of a calculated amount of propylene oxide serves to provide the second block and subsequent introduction and reaction of ethylene oxide completes the alkoxylation. Customarily the alkoxylated product is finally treated with weak acid to neutralize any basic catalyst residues.

It should be understood that each separate alkoxylation procedure serves to introduce a desired average number of alkylene oxide units per alcohol molecule. Thus, for example, the initial treatment of an alcohol mixture with six moles of ethylene oxide per mole of alcohol serves to effect the ethoxylation of each alcohol molecule with ethylene oxide to an average of 6 ethylene oxide moieties per alcohol moiety, although some alcohol moieties will have become combined with more than 6 ethylene oxide moieties and some will have become combined with less than 6. The variation in the number of alkylene oxide moieties is not critical so long as the average for the number of units in each block is within the limits set out for the $x$, $y$ and $z$ terms of the above Formulas I and III, which terms, as average values, are other than whole numbers in some instances.

Each alkoxylation is conducted at an elevated temperature and pressure. Suitable reaction temperatures are from about 120° C. to about 222° C. with the range from about 140° C. to about 160° C. being preferred. A suitable reaction pressure is achieved by introducing to the reaction vessel the required amount of ethylene oxide or propylene oxide, each of which has a high vapor pressure at the desired reaction temperature. The pressure serves as a measure of the degree of reaction and each alkoxylation is considered to be complete when the pressure no longer decreases with time.

The alcohol alkoxylates of the invention are useful as surfactants and particularly as non-ionic detergents in the washing of clothes and other materials. The alcohol alkoxylates are useful per se or are combined with other surfactants, sequestering agents, wetting agents and the like.

To further illustrate the novel alcohol alkoxylates of the invention, the following examples are provided.

EXAMPLE I

An alkoxylate within the scope of the invention was prepared employing as the alcohol feed an anhydrous mixture derived from 0.448 g. of sodium hydroxide and 125 g. of mixed $C_{12}$, $C_{13}$, $C_{14}$ and $C_{15}$ primary alcohols, in substantially equal proportions by weight, wherein approximately 80% of the alcohol of each carbon number was straight-chain, approximately 10% of the alcohol of each carbon number was beta-methyl branched and the remainder of the alcohol of each carbon number consisted of alcohols having beta-ethyl, beta-propyl, beta-butyl and beta-butyl branched structures.

The temperature of the reactor in which the mixture was maintained was raised to 145±5° C. and kept at that temperature as ethylene oxide was introduced at the rate of about 4–5 g./minute to the stirred reaction mixture. During the approximately 1-hour period required to add 166 g. of ethylene oxide, the pressure remained at about 50 p.s.i.g. as the temperature was maintained below 150° C. At the conclusion of the ethylene oxide addition, the stirring was continued until the pressure decreased to about 10 p.s.i.g.

A similar procedure was employed to introduce and react 145 g. of propylene oxide at a temperature of about 140° C. and a pressure during addition of 100–120 p.s.i.g. After the propylene oxide addition and after the pressure had decreased to about 30 p.s.i.g., ethylene oxide addition was begun again and carried out as before. After the final reaction period subsequent to the second addition of ethylene oxide, the product mixture was maintained at about 100° C. under a total pressure of 10 mm. to remove volatiles. The product mixture was then cooled to about 70° C. and transferred with the aid of nitrogen pressure into a botle containing 0.65 g. of acetic acid.

Analysis of the product mixture by its nuclear magnetic resonance spectrum in conjunction with the weights of the alkylene oxide employed indicated a mixture of alcohol alkoxylates having a first block averaging 6 ethylene oxide units, a second block averaging 4 propylene oxide units, and a third and terminal block averaging 6 ethylene oxide units.

EXAMPLE II

An extensive evaluation of alcohol derivatives of numerous ethylene oxide-propylene oxide-ethylene oxide ratios was made. In each case the derivatives were prepared by the procedure of Example I from an alcohol feed as therein described. In making the evaluation and in the tables which follow, certain terms were employed which are defined as follows:

Cloud Point. The temperature at which a 1% by weight solution of a surfactant turns from clear to cloudy, as the temperature is raised.

50/50 Gel Temperature. The temperature at which a 1:1 mixture of a surfactant and water undergoes a second-order transition between gel and mobile phases, the former being characterized by its high viscosity and in most cases by birefringence.

Solubility Time. The time required for complete dissolution of one drop of a liquid surfactant in water maintained at 30° C. and agitated at a constant, standard stirring rate.

Wetting Time. The standard Draves Wetting Test, determined at 25° C. and also at 60° C.

(A) One of the more important criteria for alcohol alkoxylate surfactants in the 50/50 Gel Temperature, because an unduly high value, e.g., more than about 10° C., indicates potential heterogeneity and consequent slow solubility at or near ambient temperature. The value of the 50/50 gel temperature was determined for a number of ethylene oxide-propylene oxide-ethylene oxide derivatives of the mixed $C_{12}$–$C_{15}$ alcohol feed as described in Example I. The values obtained are provided in Table I which follows wherein the headings $EO_1$ and $EO_2$ represent the average number of ethylene oxide units in the first and third blocks, respectively, and the heading "PO" represents the average number of propylene oxide units in the center propylene oxide block.

TABLE I

| $EO_1$ | PO | $EO_2$ | 50/50 gel temp., ° C. |
|---|---|---|---|
| 3 | 3 | 7 | 43 |
| 3 | 4 | 9 | 47 |
| 0 | 4 | 12 | 66 |
| 12 | 4 | 0 | 16 |
| 6 | 4 | 6 | 9 |

(B) Of commercial importance in the evaluation of alcohol alkoxylates in the Solubility Time, since an unduly high value, e.g., greater than about 1 minute, would present processing difficulties in the formulation of commercial surfactant-water mixtures. Alcohol alkoxylates were prepared as in Example I and the Solubility Time was determined for each. The results are provided in Table II wherein the headings $EO_1$, $EO_2$ and PO have the previously stated significance.

TABLE II

| $EO_1$ | PO | $EO_2$ | Solubility time, min. |
|---|---|---|---|
| 5 | 3 | 5 | 4.72 |
| 5 | 3 | 7 | 4.41 |
| 7 | 3 | 7 | 3.82 |
| 4 | 4 | 6 | 1.4 |
| 6 | 2 | 6 | 8.0 |
| 6 | 4 | 6 | 0.45 |

(C) Also of importance is the wetting time, particularly at 60° C., as this term is a measure of the surfactant efficiency at a temperature likely to be encountered in household applications. An acceptable value in this test is a time of less than 10 seconds. A series of alcohol alkoxylates was prepared as in Example I and the wetting time at 60° C. was determined for each. The results are provided in Table III wherein the headings $EO_1$, $EO_2$ and PO have the previously stated significance.

TABLE III

| $EO_1$ | PO | $EO_2$ | Wetting time, 60° C,. sec. |
|---|---|---|---|
| 6 | 4 | 6 | 7.6 |
| 6 | 6 | 6 | 32.3 |
| 6 | 8 | 6 | 28.8 |
| 6 | 4 | 4 | 17.7 |

EXAMPLE III

An evaluation of alkoxylated derivatives of an equimolar mixture of primary straight-chain $C_{12}$ and $C_{14}$ alcohols was made wherein the ethylene oxide-propylene oxide-ethylene oxide ratios were varied. In each case, the derivatives were prepared by the procedure of Example I, except, of course, for the difference in the alcohol feed. The results of the evaluation are provided in Tables IV and V, wherein the headings have the previously stated significance.

TABLE IV

| $EO_1$ | PO | $EO_2$ | 50/50 gel temp., ° C. |
|---|---|---|---|
| 6 | 4 | 6 | 10 |
| 6 | 2 | 6 | 48 |

TABLE V

| $EO_1$ | PO | $EO_2$ | Wetting time, 60° C., sec. |
|---|---|---|---|
| 6 | 4 | 6 | 9.0 |
| 6 | 6 | 6 | 24.7 |

EXAMPLE VI

The 50/50 Gel Temperature and the Wetting Time at 60° C. were determined for other mixed alcohol alkoxylates of the invention. The results of these evaluations are provided in Table VI, wherein each sample was prepared from primary alcohol mixtures wherein approximately 80% of the alcohol of each carbon number was straight chain, approximately 10% of the alcohol of each carbon number was beta-methyl branched and the remainder of the alcohol of each carbon number consisted of alcohols having beta-ethyl, beta-propyl, beta-butyl and beta-amyl branched structures. Sample A comprised derivatives of an approximately equimolar mixture of $C_{12}$ and $C_{13}$ alcohols, sample B comprised derivatives of an approximately equimolar mixture of $C_{10}$ and $C_{11}$ alcohols, and sample C comprised derivatives of an approximately equimolar mixture of $C_{10}$, $C_{11}$, $C_{12}$ and $C_{13}$ alcohols.

TABLE VI

| Sample: | $EO_1$ | PO | $EO_2$ | 50/50 gel temp.,° C. | Wetting time, 60° C., sec. |
|---|---|---|---|---|---|
| A | 6 | 3.75 | 5.25 | 3.5 | 9.0 |
| B | 4 | 2.7 | 4 | <1 | 8.3 |
| C | 5 | 3.1 | 4.5 | <1 | 7.5 |

We claim as our invention:
1. An ethylene oxide-propylene oxide-ethylene oxide alkoxylate of higher alcohols, represented by the formula

$$RO-(C_2H_4O)_x-(C_3H_6O)_y-(C_2H_4O)_z-H$$

wherein $x$ is from 3.7 to 8.4, $y$ is from 2.4 to 5.3 $z$ is from 3.7 to 7.0, the ratio of $x+z$ to $y$ is from 2.9 to 3.1, $x$ is from $1z$ to $1.2z$, the ratio of carbon atoms in R to $2(x+z)$ is from 0.52 to 0.65, and R is alkyl of 10.5 to 14.5 carbon atoms representing the average R in alkoxylate having up to 50% mole of R at least two of 10, 11, 12, 13, 14 and 15 carbon atoms, said R being alkyl of the formula

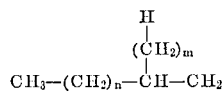

wherein $m$ is a whole number from 0 to 5 inclusive and is 0 in at least about 80% of R of each carbon number, $n$ is a whole number from 2 to 12 inclusive selected so that the sum of $m$ and $n$ is a whole number from 7 to 12 inclusive.

2. The alkoxylate of claim 1 wherein $m$ is 0 in at least about 60% of R of each carbon number.

3. The alkoxylate of claim 1 wherein from about 10% mole to about 40% mole of said alkoxylate has R of each of 12, 13, 14 and 15 carbon atoms.

4. The alkoxylate of claim 1 wherein from about 15% mole to about 30% mole of said alkoxylate has R of each 11, 12, 13, 14 and 15 carbon atoms and $m$ is 0 in at least 70% of R of each carbon atom.

5. The alkoxylate of claim 1 wherein from about 10% mole to about 40% mole of said alkoxylate has R of each of 10, 11, 12 and 13 carbon atoms.

6. The alkoxylate of claim 1 wherein said alkoxylate has R of each of 12 and 13 carbon atoms in approximately equimolar amounts.

7. The alkoxylate of claim 1 wherein $x$ is 6, $y$ is 4 and $z$ is 6.

References Cited
UNITED STATES PATENTS

| | | | |
|---|---|---|---|
| 2,174,761 | 10/1939 | Schuette et al. | 260—615B |
| 2,677,700 | 5/1954 | Jackson et al. | 260—615UX |
| 3,030,426 | 4/1962 | Moseley et al. | 260—615B |
| 3,101,374 | 8/1963 | Patton | 260—615BUX |
| 3,203,955 | 8/1965 | Jackson et al. | 260—615BUX |
| 3,324,035 | 6/1967 | Nankee et al. | 260—615BUX |
| 3,340,309 | 9/1967 | Weipert | 260—615B |

FOREIGN PATENTS

| | | | |
|---|---|---|---|
| 877,269 | 9/1961 | Great Britain | 260—615B |

HOWARD T. MARS, Primary Examiner

U.S. Cl. X.R.

252—89